US011556270B2

(12) United States Patent
Lee et al.

(10) Patent No.: US 11,556,270 B2
(45) Date of Patent: Jan. 17, 2023

(54) LEVERAGING GARBAGE COLLECTION FOR RAID TRANSFORMATION

(71) Applicant: EMC IP Holding Company LLC, Hopkinton, MA (US)

(72) Inventors: Shuyu Lee, Acton, MA (US); Vamsi K. Vankamamidi, Hopkinton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 1 day.

(21) Appl. No.: 17/143,339

(22) Filed: Jan. 7, 2021

(65) Prior Publication Data

US 2022/0214823 A1 Jul. 7, 2022

(51) Int. Cl.
*G06F 3/06* (2006.01)

(52) U.S. Cl.
CPC .......... *G06F 3/0652* (2013.01); *G06F 3/0608* (2013.01); *G06F 3/0689* (2013.01)

(58) Field of Classification Search
CPC ..... G06F 3/0652; G06F 3/0608; G06F 3/0689
See application file for complete search history.

(56) References Cited

U.S. PATENT DOCUMENTS

| 7,610,437 B2* | 10/2009 | Sinclair | G06F 3/0652 |
| | | | 711/104 |
| 7,984,084 B2* | 7/2011 | Sinclair | G06F 16/1847 |
| | | | 707/818 |
| 8,285,918 B2* | 10/2012 | Maheshwari | G06F 12/0891 |
| | | | 711/159 |
| 8,443,263 B2* | 5/2013 | Selinger | G06F 11/1068 |
| | | | 714/768 |
| 8,873,284 B2* | 10/2014 | Sinclair | G06F 12/0246 |
| | | | 365/185.11 |

(Continued)

FOREIGN PATENT DOCUMENTS

| CN | 110347613 A | * | 10/2019 | ......... G06F 12/0246 |
| JP | 3778980 B2 | * | 5/2006 | .......... G06F 11/1076 |
| JP | 2009230742 A | * | 10/2009 | ............ G06F 3/0617 |

OTHER PUBLICATIONS

Thomas Jansson, "Migrate from RAID 6 to RAID 5 with mdadm", Sep. 2, 2013, pp. 1-5, https://www.tjansson.dk/2013/09/migrate-from-raid-6-to-raid-5-with-mdadm/ (Year: 2013).*

(Continued)

*Primary Examiner* — Christopher D Birkhimer
(74) *Attorney, Agent, or Firm* — BainwoodHuang

(57) ABSTRACT

A technique performs Redundant Array of Independent Disks (RAID) transformation. The technique involves performing a garbage collection operation on a first uber within a storage array, the garbage collection operation freeing a set of disk slices of the first uber. The technique further involves, upon completing the garbage collection operation, reallocating storage of the set of disk slices from the first uber to a second uber within the storage array. The technique further involves, after the storage of the set of disk slices is reallocated from the first uber to the second uber, storing data within the second uber. Such leveraging of garbage collection when performing RAID transformation reduces overhead and wear without not negatively affecting system performance.

21 Claims, 9 Drawing Sheets

(56) References Cited

U.S. PATENT DOCUMENTS

| | | | |
|---|---|---|---|
| 9,223,693 B2* | 12/2015 | Sinclair | G06F 12/0246 |
| 9,336,133 B2* | 5/2016 | Sinclair | G06F 12/0246 |
| 9,348,746 B2* | 5/2016 | Sinclair | G06F 12/0246 |
| 9,465,731 B2* | 10/2016 | Sinclair | G06F 3/0688 |
| 9,734,050 B2* | 8/2017 | Sinclair | G06F 12/0253 |
| 9,734,911 B2* | 8/2017 | Sinclair | G06F 3/0658 |
| 9,778,855 B2* | 10/2017 | Sinclair | G06F 3/064 |
| 9,785,366 B1 | 10/2017 | Morley et al. | |
| 9,880,743 B1 | 1/2018 | Armangau et al. | |
| 10,120,613 B2* | 11/2018 | Sinclair | G06F 12/02 |
| 10,133,490 B2* | 11/2018 | Sinclair | G06F 3/0655 |
| 10,365,983 B1* | 7/2019 | Foley | G06F 11/2094 |
| 10,402,091 B1 | 9/2019 | Vankamamidi et al. | |
| 10,430,279 B1* | 10/2019 | Dittia | G06F 3/0656 |
| 10,579,593 B2 | 3/2020 | Bassov et al. | |
| 10,664,363 B2 | 5/2020 | Liu et al. | |
| 10,789,170 B2 | 9/2020 | Kang et al. | |
| 10,983,715 B2* | 4/2021 | Sharoni | G06Q 20/105 |
| 11,099,768 B2 | 8/2021 | Kumar et al. | |
| 11,341,003 B2 | 5/2022 | Liu et al. | |
| 2006/0085594 A1* | 4/2006 | Roberson | G06F 11/1076 |
| | | | 714/E11.034 |
| 2007/0033325 A1* | 2/2007 | Sinclair | G06F 3/0608 |
| | | | 711/170 |
| 2008/0082596 A1* | 4/2008 | Gorobets | G06F 12/0253 |
| 2008/0189477 A1* | 8/2008 | Asano | G06F 12/0246 |
| | | | 711/E12.008 |
| 2011/0145473 A1* | 6/2011 | Maheshwari | G06F 12/0873 |
| | | | 711/E12.008 |
| 2011/0161784 A1* | 6/2011 | Selinger | G06F 11/1016 |
| | | | 714/E11.002 |
| 2014/0325148 A1* | 10/2014 | Choi | G06F 3/0659 |
| | | | 711/114 |
| 2014/0365719 A1* | 12/2014 | Kuzmin | G06F 12/0246 |
| | | | 711/103 |
| 2016/0179410 A1* | 6/2016 | Haas | G06F 3/0616 |
| | | | 714/6.24 |
| 2016/0246713 A1* | 8/2016 | Choi | G06F 3/0608 |
| 2017/0123655 A1* | 5/2017 | Sinclair | G06F 3/061 |
| 2019/0087268 A1* | 3/2019 | Koltsidas | G06F 3/0635 |
| 2020/0089420 A1* | 3/2020 | Sharoni | G06F 21/79 |
| 2021/0248068 A1* | 8/2021 | Izen | G06F 3/0632 |

OTHER PUBLICATIONS

Anonymous, "RAID", Oct. 18, 2007, pp. 1-8, https://web.archive.org/web/20071018033553/https://www.prepressure.com/library/technology/raid (Year: 2007).*

* cited by examiner

LEVERAGING GARBAGE COLLECTION FOR RAID TRANSFORMATION

BACKGROUND

In a conventional circular log storage system, data is always written to new storage. Typically, such storage is arranged in accordance with a particular Redundant Array of Independent Disks (RAID) configuration. An example RAID configuration is RAID5(4+1) in which each storage stripe consists of four segments for data and one segment for parity.

During operation, old storage locations containing invalid data are marked as holes. Garbage collection is then performed on storage stripes containing such holes to provide new storage for future use.

SUMMARY

Unfortunately, there are deficiencies with the above-described conventional circular log storage system. For example, in such a conventional circular log storage system, a RAID transformation that replaces an existing RAID configuration with a new RAID configuration is performed independently of garbage collection, and such a RAID transformation can be very extensive and expensive.

Along these lines, suppose that an administrator has recently added new storage capacity and wishes to transform an existing RAID configuration into a new RAID configuration to utilize the new storage capacity. For example, the administrator may wish to relocate data from old drives to new drives while keeping the same RAID layout such as RAID5(4+1). As another example, the administrator may wish to transform an existing RAID configuration to one with better storage efficiency such as moving from a RAID5(4+1) configuration to a RAID5(8+1) configuration. As yet another example, the administrator may wish to transform an existing RAID configuration to one with better RAID protection such as moving from a RAID5(4+1) configuration to a RAID5(8+2) configuration.

In the above-described transformation scenarios for the conventional circular log storage system, the transformation work may achieve the desired transformation outcome, but there are no side benefits. That is, data is moved for relocation and transformation only, while garbage collection is performed independently. Accordingly, even though the conventional circular log storage system may perform transformation as well as garbage collection, there is no synergy or savings incurred.

In contrast to the above-identified conventional circular log storage system which independently performs RAID transformation and garbage collection without any side benefit, improved techniques are directed to performing RAID transformation while leveraging garbage collection. Along these lines, in log-structured storage, garbage collection is performed to free an initial uber, and disk slices of the initial uber are then unmapped and remapped to form a new uber. Data is then written to the new uber during normal log-structured storage operations (e.g., via updating data or writing new data, via standard garbage collection, etc.). Such leveraging of garbage collection when performing RAID transformation reduces overhead (e.g., less reads and writes) and wear (e.g., fewer program/erase cycles) without negatively affecting system performance.

One embodiment is directed to a method of performing RAID transformation. The method includes performing a garbage collection operation on a first uber within a storage array. The garbage collection operation frees a set of device slices of the first uber. The method further includes, upon completing the garbage collection operation, reallocating storage of the set of disk slices from the first uber to a second uber within the storage array. The method further includes, after the storage of the set of disk slices is reallocated from the first uber to the second uber, storing data within the second uber.

Another embodiment is directed to data storage equipment which includes memory and control circuitry coupled to the memory. The memory stores instructions which, when carried out by the control circuitry, causes the control circuitry to perform a method including:
  (A) performing a garbage collection operation on a first uber within a storage array, the garbage collection operation freeing a set of disk slices of the first uber,
  (B) upon completing the garbage collection operation, reallocating storage of the set of disk slices from the first uber to a second uber within the storage array, and
  (C) after the storage of the set of disk slices is reallocated from the first uber to the second uber, storing data within the second uber.

Yet another embodiment is directed to a computer program product a non-transitory computer readable medium which stores a set of instructions to perform RAID transformation. The set of instructions, when carried out by computerized circuitry, causes the computerized circuitry to perform a method including:
  (A) performing a garbage collection operation on a first uber within a storage array, the garbage collection operation freeing a set of disk slices of the first uber;
  (B) upon completing the garbage collection operation, reallocating storage of the set of disk slices from the first uber to a second uber within the storage array; and
  (C) after the storage of the set of disk slices is reallocated from the first uber to the second uber, storing data within the second uber.

In some arrangements, performing the garbage collection operation includes garbage collecting the first uber entirely to free all disk slices of the first uber. Advantageously, the disk slices of the first uber may be unmapped upon (i.e., soon after and because of) freeing all of the disk slices of the first uber.

In some arrangements, reallocating the storage of the set of disk slices from the first uber to the second uber includes unmapping the first uber to deconstruct the first uber.

In some arrangements, reallocating the storage of the set of disk slices from the first uber to the second uber further includes, after the first uber is unmapped, creating the second uber from the storage of the set of disk slices from the first uber.

In some arrangements, creating the second uber includes mapping a new set of disk slices to construct the second uber, the new set of disk slices reusing at least some of the storage of the set of disk slices from the first uber.

It should be understood that such leveraging of garbage collection when relocating data is well suited for a variety of situations. In some arrangements, the first uber and the second uber implement a same RAID configuration (e.g., RAID5(4+1), RAID5(8+1), RAID5(8+2), etc.). In some arrangements, the first uber implements a first RAID width; and the second uber implements a second RAID width that is different from the first RAID width. In some arrangements, the first uber and the second uber have a same number of disk slices storing parity (e.g., one parity disk slice, two parity disk slices, etc.). In some arrangements, the first uber has a first number of disk slices storing parity; and the second uber has a second number of disk slices storing parity, the second number of disk slices storing parity being different from the first number of disk slices storing parity. In some arrangements, the second uber includes all of storage of the disk slices of the first uber. Situations such as those described above, combinations thereof, and others are suitable for use as well.

In some arrangements, garbage collecting the first uber entirely to free all disk slices of the first uber includes consolidating all valid data from the first uber into a third uber which is different from the first uber and the second uber.

In some arrangements, storing the data within the second uber includes storing at least some valid data from the third uber into the second uber.

In some arrangements, storing the at least some valid data from the third uber into the second uber includes updating the valid data to form newest data and writing the newest data into the second uber.

In some arrangements, storing the at least some valid data from the third uber into the second uber includes consolidating a least a portion of the at least some valid data from the third uber into the second uber.

In some arrangements, the method further includes constructing the first uber and storing data in the first uber and, after the first uber is constructed and after data is stored in the first uber, detecting a set of new storage devices being added to the storage array. The set of new storage devices provides new disk slices that are separate from storage of the first uber.

In some arrangements, reallocating the storage of the set of disk slices from the first uber includes constructing the second uber from at least some of the storage of the set of disk slices from the first uber and storage of the set of new storage devices.

In some arrangements, the method further includes, after constructing the first uber and prior to performing the garbage collection operation, incorporating the first uber in log-structured storage.

In some arrangements, the method further includes, after constructing the second uber and prior to storing the data within the second uber, incorporating the second uber in the log-structured storage.

It should be understood that, in the cloud context, at least some electronic circuitry (e.g., hosts, backup sites, etc.) is formed by remote computer resources distributed over a network. Such an electronic environment is capable of providing certain advantages such as high availability and data protection, transparent operation and enhanced security, big data analysis, etc.

Other embodiments are directed to electronic systems and apparatus, processing circuits, componentry, computer program products, and so on. Some embodiments are directed to various methods, electronic components and circuitry which are involved in performing RAID transformation while leveraging garbage collection.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to performing Redundant Array of Independent Disks (RAID) transformation while leveraging garbage collection. Along these lines, in log-structured storage, garbage collection is performed to free an initial uber, and disk slices of the initial uber are then unmapped and remapped to form a new uber. The new uber is then consumed during normal log-structured storage operations (e.g., via updating data or writing new data, via standard garbage collection, etc.). Such leveraging of garbage collection when performing RAID transformation reduces overhead (e.g., less reads and writes) and wear (e.g., fewer program/erase cycles) without negatively affecting system performance.

Figure 1:
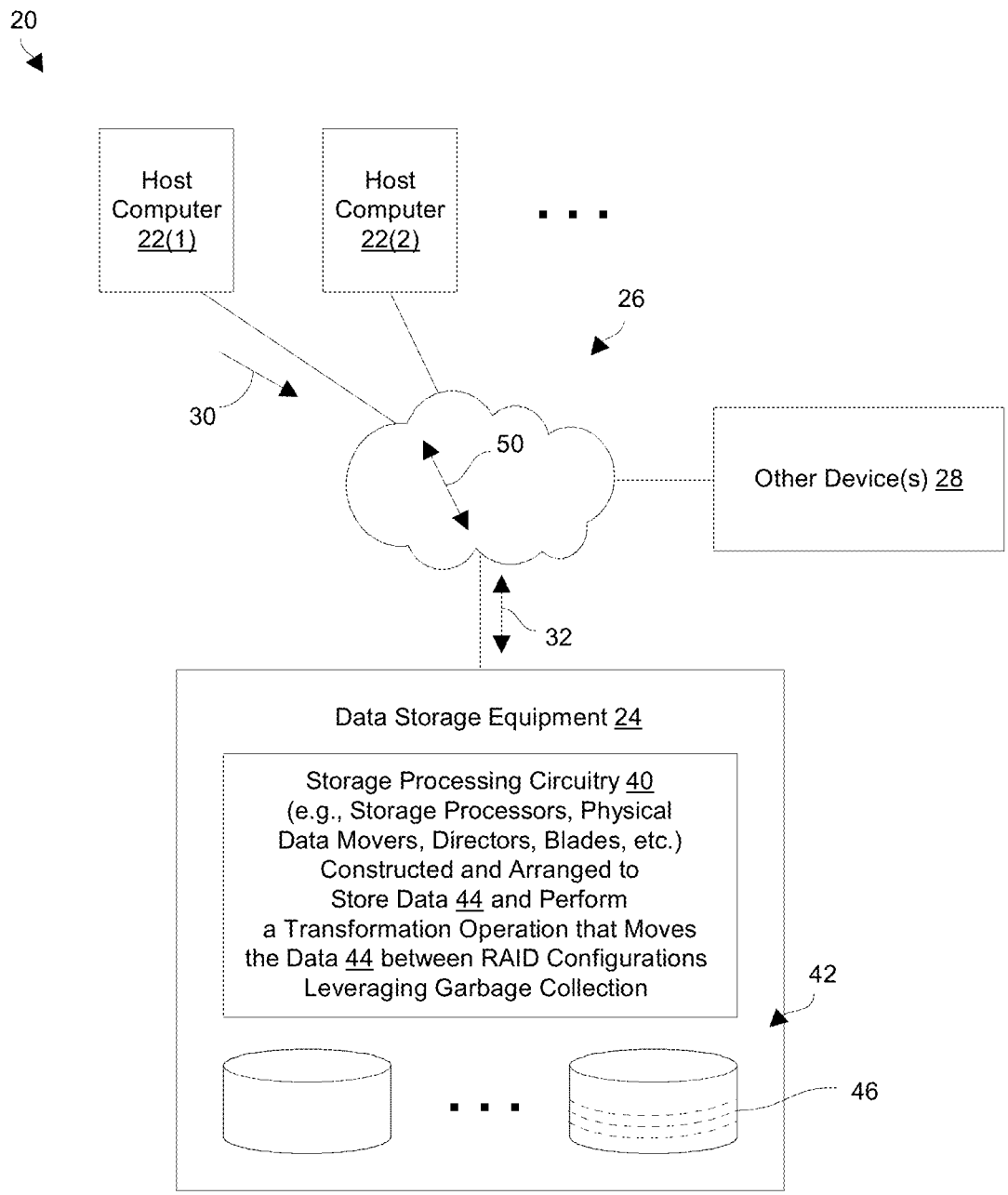
FIG. 1 is a block diagram of a data storage environment which performs RAID transformation while leveraging garbage collection in accordance with certain embodiments.

FIG. 1 shows a data storage environment 20 which performs data relocation between RAID configurations while leveraging garbage collection in accordance with certain embodiments. The data storage environment 20 includes host computers 22(1), 22(2), ... (collectively, host computers 22), data storage equipment 24, a communications medium 26, and perhaps other devices 28.

Each host computer 22 is constructed and arranged to perform useful work. For example, one or more of the host computers 22 may operate as a file server, a web server, an email server, an enterprise server, a database server, a transaction server, combinations thereof, etc. which provides host input/output (I/O) requests 30 to the data storage equipment 24. In this context, the host computers 22 may provide a variety of different I/O requests 30 (e.g., block and/or file based write commands, block and/or file based read commands, combinations thereof, etc.) that direct the data storage equipment 24 to store host data 32 within and retrieve host data 32 from storage (e.g., primary storage or main memory, secondary storage or non-volatile memory, tiered storage, combinations thereof, etc.).

The data storage equipment 24 includes storage processing circuitry 40 and storage devices 42. The storage processing circuitry 40 is constructed and arranged to respond to the host I/O requests 30 from the host computers 22 by writing data 44 into the storage devices 42 and reading the data 44 from the storage devices 42. The storage processing circuitry 40 may include one or more storage processors or engines, data movers, director boards, blades, I/O modules, storage device controllers, switches, other hardware, combinations thereof, and so on. Furthermore, at least some of the storage devices 42 are solid state devices providing disk slices 46. Such disk slices 46 form log-structured storage which is implemented using a mapped-RAID architecture.

While processing the host I/O requests 30, the storage processing circuitry 40 stores the data 44 within the log-structured storage. Additionally, the storage processing circuitry 40 may provide a variety of specialized data storage services and features such as caching, storage tiering, deduplication, compression, encryption, mirroring and/or other RAID protection, snapshotting, backup/archival services, replication to other data storage equipment, and so on. As will be explained in further detail shortly, the storage processing circuitry 40 is capable of performing relocation and transformation work that moves data 44 from an initial RAID configuration to a new RAID configuration by leveraging garbage collection.

It should be understood that the data 44 may include the host data 32 from the host computers 22. The data 44 may include other data as well such as data created from user-level applications running on the data storage equipment 24, data generated from processing the host data 32 locally on the data storage equipment 24, snapshots of the host data 32, and so on. The data 44 may further include other types of data such as parity, mapping data, block and/or file system metadata, deduplication data, compression data, versioning data, data to support recovery, configuration data, and other types of metadata, combinations thereof, and so on, which is managed and maintained by the data storage equipment 24.

The communications medium 26 is constructed and arranged to connect the various components of the data storage environment 20 together to enable these components to exchange electronic signals 50 (e.g., see the double arrow 50). At least a portion of the communications medium 26 is illustrated as a cloud to indicate that the communications medium 26 is capable of having a variety of different topologies including backbone, hub-and-spoke, loop, irregular, combinations thereof, and so on. Along these lines, the communications medium 26 may include copper-based data communications devices and cabling, fiber optic devices and cabling, wireless devices, combinations thereof, etc. Furthermore, the communications medium 26 is capable of supporting LAN-based communications, SAN-based communications, cellular communications, WAN-based communications, distributed infrastructure communications, other topologies, combinations thereof, etc.

The other devices 28 represent other possible componentry of the data storage environment 20. Along these lines, the other devices 28 may include remote data storage equipment that provides user data 44 to and/or receives user data 44 from the data storage equipment 24 (e.g., replication arrays, backup and/or archiving equipment, service processors and/or management devices, etc.).

During operation, the storage processing circuitry 40 of the data storage equipment 24 performs data storage operations to richly and robustly store the data 44 within the storage devices 42. Along these lines, the storage processing circuitry 40 writes new data and updates existing data by writing the data 44 to log-structured storage formed from solid state memory. The log-structured storage includes ubers (or RAID extents), i.e., disk slices 46 in a particular RAID configuration. Example RAID configurations for the log-structured storage include RAID1, RAID5(4+1), RAID5 (8+1), RAID5(8+2), RAID5(12+1), RAID6, RAID10, among others.

Additionally, to ensure there is available storage space within the log-structured storage, the storage processing circuitry 40 performs standard garbage collection in the background to consolidate the data 44 and reclaim storage space. Along these lines, such standard garbage collection reads valid data 44 from inefficiently utilized memory spaces and writes the valid data 44 to new memory spaces within the log-structured storage. In accordance with certain embodiments, the storage processing circuitry 40 performs writes using physical large block (PLB) granularity.

Furthermore, the storage processing circuitry 40 may perform a RAID transformation operation in which the storage processing circuitry 40 relocates the data 44 that initially resides within a particular RAID configuration to a new RAID configuration. Along these lines, new storage devices 42 may have been added to increase storage capacity or certain data may have been moved to another array thus freeing up existing storage devices 42. RAID transformation examples include relocating the data 44 from old storage devices 42 to new storage devices 42 while keeping the same RAID layout (e.g., from RAID5(4+1) to RAID5(4+1)), increasing the RAID width to increase storage efficiency (e.g., from RAID5(4+1) to RAID5(8+1)), improving RAID protection (e.g., from RAID5(8+1) to RAID5(8+2)), combinations thereof (e.g., from RAID5(4+1) to RAID(8+2)), and so on.

During the RAID transformation operation, the storage processing circuitry 40 performs a specialized garbage collection operation on a first uber to free all of the disk slices 46 of the first uber. Unlike a normal garbage collection service which garbage collects only the most sparsely populated memory spaces, the specialized garbage collection operation involves relocating all of the data 44 from the first uber. Accordingly, the first uber is now entirely free so that the disk slices 46 forming the first uber may be reused.

Upon completing the specialized garbage collection operation, the storage processing circuitry 40 reallocates the disk slices 46 to create a second uber. In particular, soon after and because of completion of the specialized garbage collection operation, the storage processing circuitry 40 unmaps the disk slices 46 that belonged to the first uber and remaps the disk slices 46 to form the second uber. The second uber may include one or more of the disk slices 46 that belonged to the first uber.

The second uber now provides available storage space for log-structured storage. Accordingly, the data 44 that is written to the second uber may include updated data, new data, consolidated data from standard garbage collection, combinations thereof, and so on.

It should be understood that overall there are less writes than a conventional approach which involves independently performing a conventional transformation task and a conventional garbage collection task in which there are no additional benefits derived by each task. Rather, there is a significant saving of write operations (i.e., work) via the above-described RAID transformation which leverages garbage collection. Moreover, there is less wear placed on the solid state memory (i.e., fewer program erase cycles). Further details regarding RAID transformation will be provided shortly.

Figure 2:
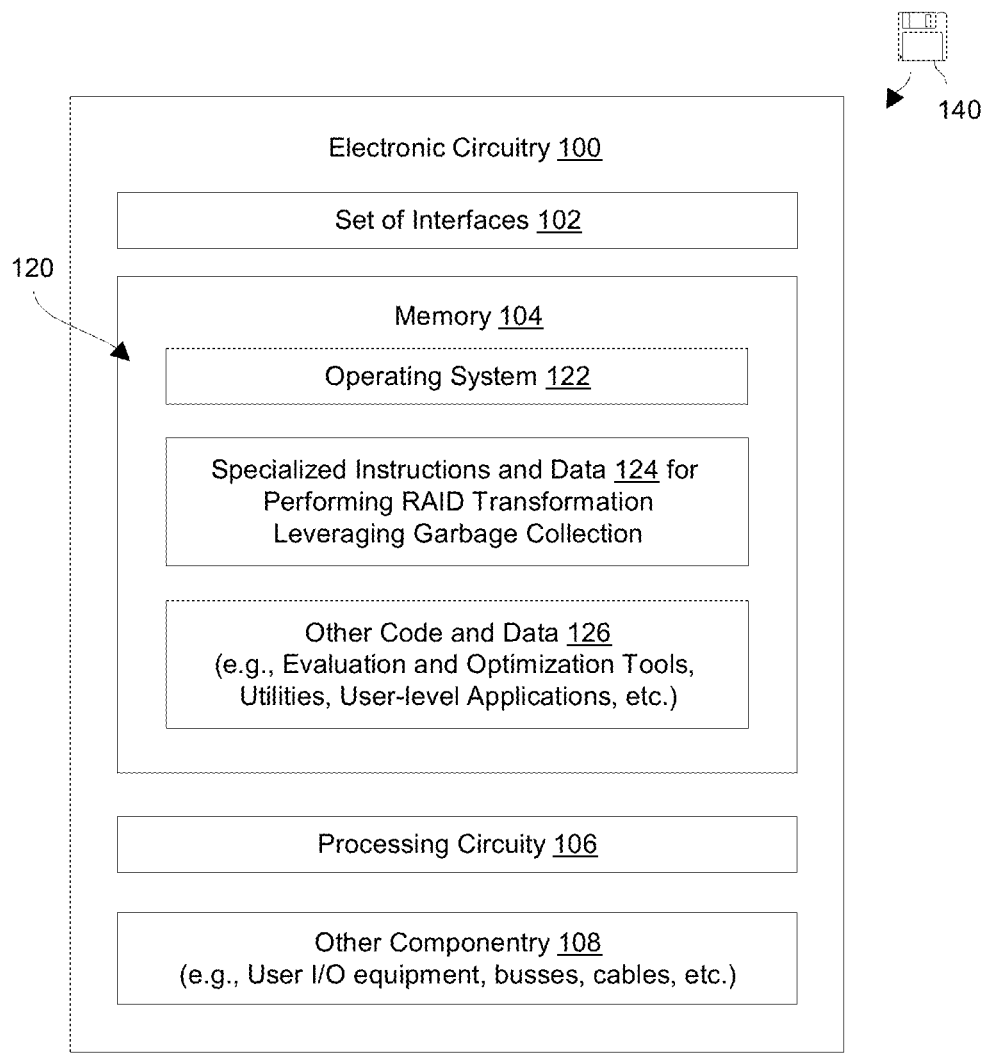
FIG. 2 is a block diagram of data storage equipment of the data storage environment in accordance with certain embodiments.

FIG. 2 shows electronic circuitry 100 which is suitable for the storage processing circuitry 40 of the data storage equipment 24 (also see FIG. 1). The electronic circuitry 100 includes a set of interfaces 102, memory 104, and processing circuitry 106, and other circuitry 108.

The set of interfaces 102 is constructed and arranged to connect the electronic circuitry 100 to the communications medium 26 (also see FIG. 1) to enable communications with other devices of the data storage environment 20 (e.g., the host computers 22). Such communications may be IP-based, SAN-based, cellular-based, cable-based, fiber-optic based, wireless, cloud-based, combinations thereof, and so on. Accordingly, the set of interfaces 102 may include one or more host interfaces (e.g., a computer network interface, a fibre-channel interface, etc.), one or more storage device interfaces (e.g., a host adapter or HBA, etc.), and other interfaces. As a result, the set of interfaces 102 enables the electronic circuitry 100 to robustly and reliably communicate with other external apparatus.

The memory 104 is intended to represent both volatile storage (e.g., DRAM, SRAM, etc.) and non-volatile storage (e.g., flash memory, magnetic memory, etc.). The memory 104 stores a variety of software constructs 120 including an operating system 122, specialized instructions and data 124, and other code and data 126. The operating system 122 refers to particular control code such as a kernel to manage computerized resources (e.g., processor cycles, memory space, etc.), drivers (e.g., an I/O stack), and so on. The specialized instructions and data 124 refers to particular instructions for performing RAID transformation leveraging garbage collection. In some arrangements, the specialized instructions and data 124 is tightly integrated with or part of the operating system 122 itself. The other code and data 126 refers to applications and routines to provide additional operations and services (e.g., performance measurement tools, etc.), user-level applications, administrative tools, utilities, and so on.

The processing circuitry 106 is constructed and arranged to operate in accordance with the various software constructs 120 stored in the memory 104. As will be explained in further detail shortly, the processing circuitry 106 executes the operating system 122 and the specialized code 124 to form specialized circuitry that robustly and reliably manages host data on behalf of a set of hosts. Such processing circuitry 106 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 140 is capable of delivering all or portions of the software constructs 120 to the storage processing circuitry 106. In particular, the computer program product 140 has a non-transitory (or non-volatile) computer readable medium which stores a set of instructions that controls one or more operations of the electronic circuitry 100. Examples of suitable computer readable storage media include tangible articles of manufacture and apparatus which store instructions in a non-volatile manner such as DVD, CD-ROM, flash memory, disk memory, tape memory, and the like.

The other componentry 108 refers to other hardware of the electronic circuitry 100. Along these lines, the electronic circuitry 100 may include special user I/O equipment (e.g., a service processor), busses, cabling, adaptors, auxiliary apparatuses, other specialized data storage componentry, etc.

It should be understood that the processing circuitry 106 operating in accordance with the software constructs 120 enables RAID transformation while leveraging garbage collection. Overall, the processing circuitry 106 performs less write operations than a conventional data storage system that independently performs a transformation task and a garbage collection task where there are no additional benefits derived by each task.

Details of a few example situations will now be provided with reference to FIGS. 3 through 8. In a first example situation, it may be desirable to relocate data from old drives to new drives while keeping the same RAID layout (e.g., RAID5(4+1) before and after transformation). In a second example situation, it may be desirable to transform to a wider RAID width to improve storage efficiency (e.g., from RAID5(4+1) to RAID5(8+1)). In a third example situation, it may be desirable to transform to a RAID configuration that provides greater RAID protection and maintain the same storage efficiency (e.g., from RAID5(4+1) to RAID(8+2)). Other RAID transformations are available as well (e.g., from RAID5(8+1) to RAID5(8+2), from RAID5(12+1) to RAID5 (8+2), etc.).

Figure 3:
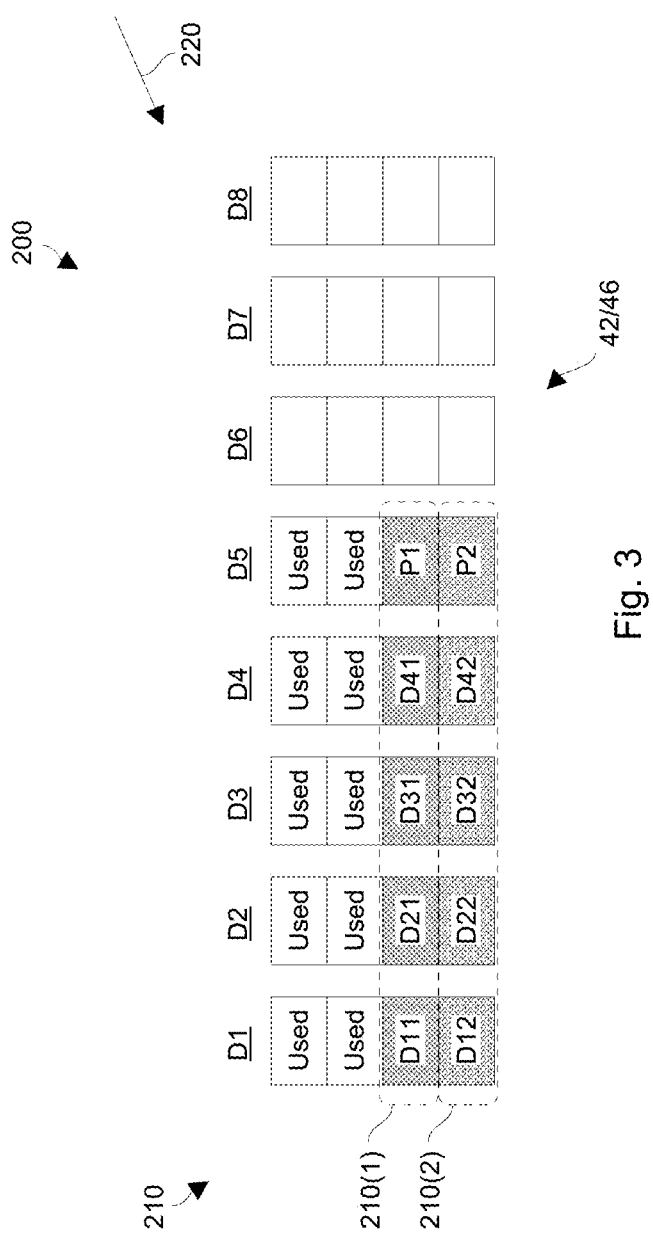
FIG. 3 is a block diagram illustrating particular details of a first RAID transformation example in accordance with certain embodiments.
Figure 4:
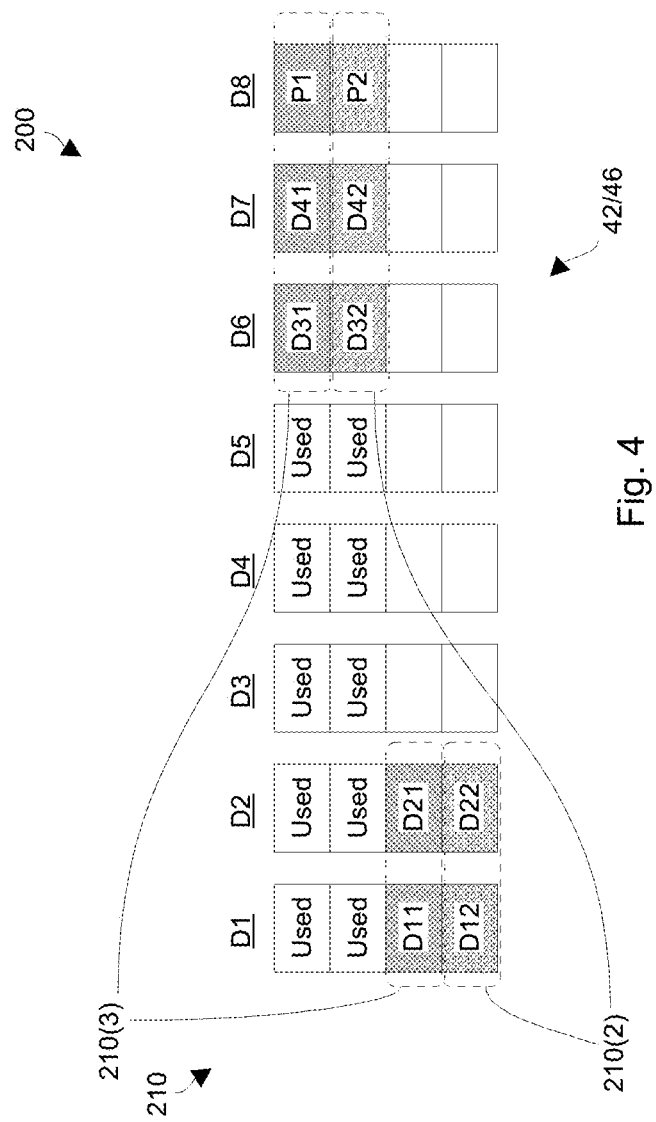
FIG. 4 is a block diagram illustrating additional details of the first RAID transformation example in accordance with certain embodiments.

FIGS. 3 and 4 show various details 200 for the first example situation in which the storage processing circuitry 40 (FIG. 1) relocates data 44 from old drives to new drives while keeping the same RAID layout (e.g., RAID5(4+1)) in accordance with certain embodiments. FIG. 3 shows where data 44 originally resides prior to relocating data 44 to another configuration. FIG. 4 shows where the data 44 eventually resides after relocating the data 44 to the other configuration while leveraging garbage collection.

Initially, as shown in FIG. 3, suppose that storage devices 42 identified as D1, D2, D3, D4, and D5 are currently in use (also see FIG. 1). Along these lines, the storage processing circuitry 40 initially maps a set of disk slices 46 to form a first uber 210(1), and another set of disk slices 46 to form a second uber 210(2) (also see the storage processing circuitry 40 and disk slices 46 in FIG. 1). In particular, the first uber 210(1) includes four disk slices 46 mapped as D11, D21, D31, and D41 to store data, and one disk slice 46 mapped as P1 to store parity in accordance with RAID5(4+1). Similarly, the second uber 210(2) includes four disk slices 46 mapped as D12, D22, D32, and D42 to store data, and one disk slice 46 mapped as P2 to store parity in accordance with RAID5(4+1). It should be understood that the storage device D5 is shown as providing both parity disk slices 46 for simplicity but that other storage devices 46 may provide parity disk slices 46 as well (e.g., parity disk slices 46 may be distributed evenly, in a staggered manner, randomly, etc.) to balance traffic, loading, wear, etc.

Additionally, it should be further understood that the storage devices D1, D2, D3, D4, and D5 may provide other disk slices 46 that are mapped to form other ubers 210. For simplicity, such other disk slices 46 are marked as "used" in FIG. 3, and such other ubers 210 may use a RAID5(4+1) configuration and/or other RAID configurations.

Further suppose that additional capacity has just been added in the form of new storage devices 42 identified as D6, D7, and D8. Along these lines, the storage devices D6, D7, and D8 may have been added to increase storage capacity of the log-structured storage, to replace older storage devices 42 that are getting closer to their end of life or wear limit (e.g., a maximum number of program/erase cycles indicated by the storage device manufacturer), and so on.

Now, suppose that the administrator of the data storage equipment 24 wishes to begin utilizing the additional storage space provided by storage devices D6, D7, and D8. To this end, the administrator may invoke a special process that performs RAID transformation leveraging garbage collection. Such a process utilizes the additional storage space from the storage devices D6, D7, and D8, but entails significantly less write operations than a conventional approach of independently relocating data between RAID configurations and performing garbage collection.

For example, the administrator may send a RAID transformation command 220 to the storage processing circuitry 40 that directs the storage processing circuitry 40 perform the special process. The RAID transformation command 220 may specify particular details such as which new storage devices 42 to utilize during the transformation process, a particular RAID layout for one or more new ubers, one or more initial ubers to unmap/remap, and so on.

Alternatively, the storage processing circuitry 40 may automatically identify candidate storage devices 42, candidate ubers, etc. based on analytics and simply prompt the administrator for authorization to proceed. Other ways of initiating the command 220 to begin the process are suitable for use as well such as automatically starting the process based on satisfaction of certain triggering criteria (e.g., detecting the addition of sufficient new storage capacity, identifying a relatively quiet period of operation that is well suited for the transformation process, based on a scheduled start time, based on storage devices 42 reaching a particular wear threshold, combinations thereof, and so on).

In response to the command 220, the storage processing circuitry 40 identifies (i) one or more existing ubers 210 to process, (ii) a RAID layout for one or more new ubers 210, and (iii) the storage devices 42 that will provide additional disk slices 46 for the one or more new ubers 210. In the example, suppose that the storage processing circuitry 40 identifies existing ubers 210(1), 210(2) for RAID transformation. Further suppose that the command 220 indicates that the new ubers 210 are to use a RAID5(4+1) layout (i.e., the same as that of the existing ubers 210(1), 210(2)).

During the transformation process, the storage processing circuitry 40 performs a specialized garbage collection operation that frees the existing ubers 210(1), 210(2) entirely. That is, such garbage collecting consolidates the valid data 44 residing within the ubers 210(1), 210(2) to other storage within the log-structured storage. However, such garbage collecting relocates the valid data 44 from all of the disk slices 46 forming the ubers 210(1), 210(2) regardless of how many holes currently exist within the ubers 210(1), 210(2).

Upon completion of (i.e., soon after and because of) the specialized garbage collection operation, the storage processing circuitry 40 remaps disk slices 46 from the existing ubers 210(1), 210(2) to new ubers 210(3), 210(4). In the first example of FIGS. 3 and 4, only some of the disk slices 46 are reused.

In particular, the storage processing circuitry 40 unmaps the uber 210(1) to deconstruct the uber 210(1). The storage processing circuitry 40 then maps disk slices 46 to create the new uber 210(3). By way of example, the storage processing circuitry 40 uses the storage of the same disk slices 46 from the storage devices D1 and D2 that were used to form the uber 210(1) and new storage from the storage devices D6, D7, and D8. FIG. 4 shows the new uber 210(3) created from disk slices 46 mapped as D11, D21, D31, D41, and P1 from storage devices D1, D2, D6, D7, and D8.

Similarly, the storage processing circuitry 40 unmaps the uber 210(2) to deconstruct the uber 210(2). The storage processing circuitry 40 then maps disk slices 46 to create the new uber 210(4). Again and by way of example, the storage processing circuitry 40 uses the storage from the storage devices D1 and D2 that was used to form the uber 210(2) and new storage from the storage devices D6, D7, and D8. FIG. 4 shows the new uber 210(4) created from disk slices 46 mapped as D12, D22, D32, D42, and P2 from storage devices D1, D2, D6, D7, and D8.

Now, that the new ubers 210(3), 210(4) have been created, the new ubers 210(3), 210(4) are available for use in the log-structured storage. Along these lines, a garbage collecting background service may eventually write consolidated valid data 44 into the ubers 210(3), 210(4) during standard garbage collection. Additionally, the storage processing circuitry 40 may write updated or new data 44 into the ubers 210(3), 210(4) during normal input/output (I/O) operations.

It should be understood that, in contrast to a conventional approach of independently performing a relocation task and a garbage collection task in which there are no additional benefits derived by each task, the above-described RAID transformation process that relocates data 44 from older storage devices 42 to newer storage devices 42 requires significantly less work. Nevertheless, data is successfully and effectively garbage collected and relocated between RAID configurations. Moreover, even though the width of the RAID5(4+1) configuration is five storage devices, less than that number were added but nevertheless utilized. Further details will now be provided in accordance with the second example situation.

Figure 5:
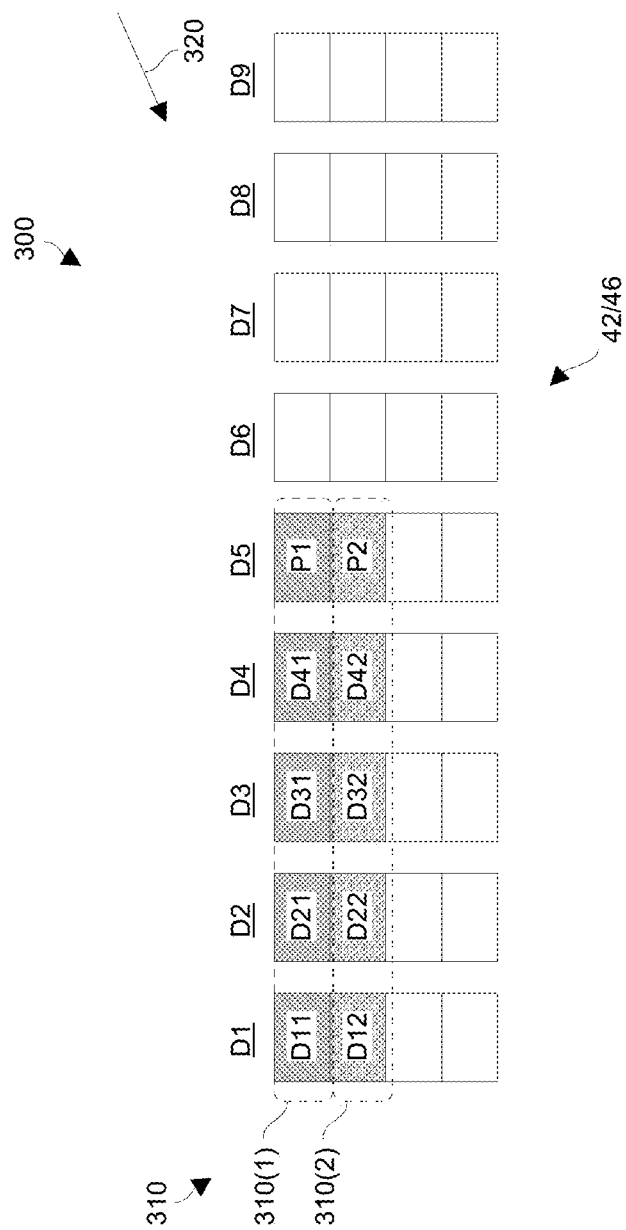
FIG. 5 is a block diagram illustrating particular details of a second RAID transformation example in accordance with certain embodiments.
Figure 6:
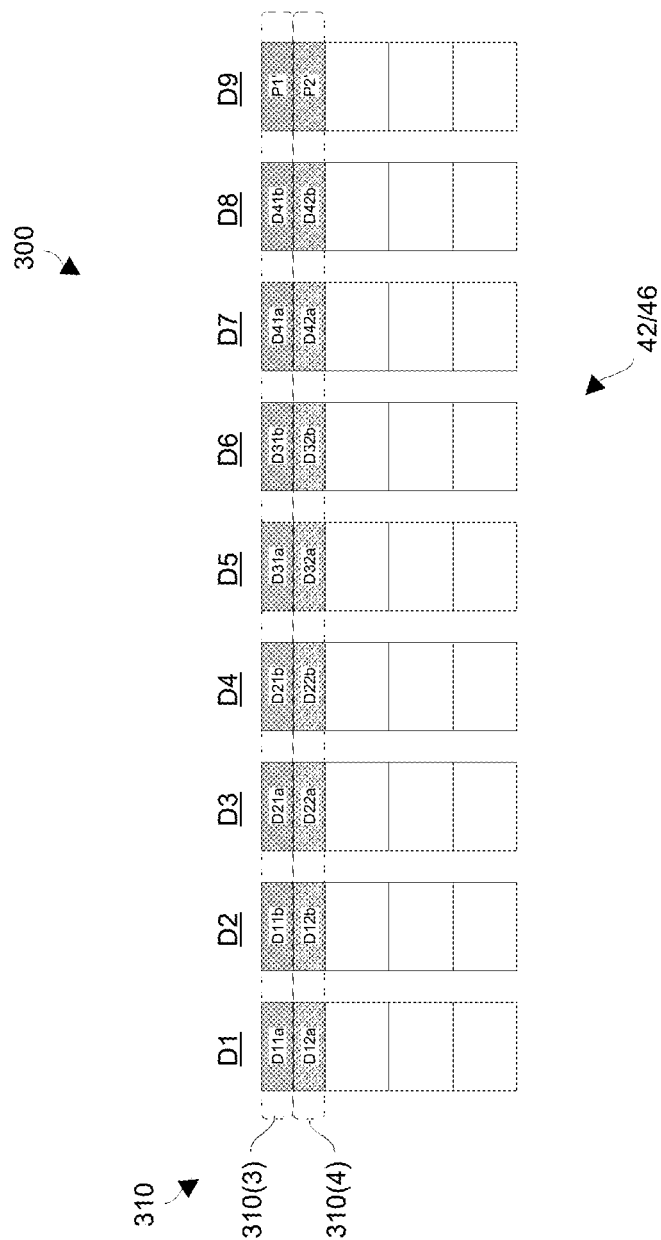
FIG. 6 is a block diagram illustrating additional details of the second RAID transformation example in accordance with certain embodiments.

FIGS. 5 and 6 show, in accordance with certain embodiments, various details for a second RAID transformation example 300 in which a new RAID configuration having a wider RAID width is used in place of an initial RAID configuration having a narrower RAID width (e.g., from RAID5(4+1) to RAID5(8+1)) thus improving storage efficiency. FIG. 5 shows where data 44 originally resides prior to RAID transformation. FIG. 6 shows where the data 44 eventually resides following RAID transformation while leveraging garbage collection.

Initially, as shown in FIG. 5, suppose that storage devices 42 identified as D1, D2, D3, D4, and D5 are currently in use (also see FIG. 1). It should be understood that the example arrangement in FIG. 5 is similar to that shown in FIG. 3, and that some of the description that applies to the first RAID transformation example 200 similarly applies to the second RAID transformation example 300. For example, the storage processing circuitry 40 initially maps a set of disk slices 46 to form a first uber 310(1), and another set of disk slices 46 to form a second uber 310(2). The first uber 310(1) includes four disk slices 46 mapped as D11, D21, D31, and D41 to store data, and one disk slice 46 mapped as P1 to store parity in accordance with RAID5(4+1). Likewise, the second uber 310(2) includes four disk slices 46 mapped as D12, D22, D32, and D42 to store data, and one disk slice 46 mapped as P2 to store parity in accordance with RAID5(4+1).

Further suppose that additional capacity has just been added in the form of new storage devices 42 identified as D6, D7, D8, and D9. Along these lines, the storage devices D6, D7, D8, and D9 may have been added to increase storage capacity of the log-structured storage, to replace older storage devices 42 that are getting closer to their end of life or wear limit (e.g., a maximum number of program/erase cycles indicated by the storage device manufacturer), and so on.

Now, suppose that the data storage equipment 24 receives a RAID transformation command 320 to begin utilizing the additional storage space provided by storage devices D6, D7, D8, and D9. Such a command 320 may be initiated in a variety of ways as similarly explained above in connection with the RAID command 220 (also see FIG. 3).

In response to the command 320, the storage processing circuitry 40 identifies (i) one or more existing ubers 310 to process, (ii) a RAID configuration for one or more new ubers 310, and (iii) the storage devices 42 that will provide additional disk slices 46 for the one or more new ubers 310. In the example, suppose that the storage processing circuitry 40 identifies existing ubers 310(1), 310(2) for RAID transformation. Further suppose that the command 320 indicates that the new ubers 310 are to use a RAID5(8+1) configuration for greater storage efficiency.

During the transformation process, the storage processing circuitry 40 performs a specialized garbage collection operation that frees the existing ubers 310(1), 310(2) entirely. That is, such specialized garbage collecting consolidates the valid data 44 residing within the ubers 310(1), 310(2) to other storage within the log-structured storage. However, such garbage collecting relocates the valid data 44 from all of the disk slices 46 forming the ubers 310(1), 310(2) regardless of how many holes currently exist within the ubers 310(1), 310(2).

Upon completion of the specialized garbage collection operation, the storage processing circuitry 40 reallocates storage from the existing ubers 310(1), 310(2) to new ubers 310(3), 310(4). That is, the storage processing circuitry 40 unmaps the disk slices 46 of the existing ubers 310(1), 310(2) to enable reuse of the storage of the disk slices 46. In this second example 300, all of the storage from the original uber 310(1) is reused, and none of the storage from the original uber 310(2) is reused.

In particular, the storage processing circuitry 40 unmaps the uber 310(1) to deconstruct the disk slices 46 that formed the uber 310(1). The storage processing circuitry 40 then maps disk slices 46 to create the new uber 310(3). By way of example, the storage processing circuitry 40 uses the same storage from the storage devices D1, D2, D3, D4, and D5 that was used to form the uber 310(1) as well as new storage from the storage devices D6, D7, D8, and D9. FIG. 6 shows the new uber 310(3) created from disk slices 46 mapped as D11a, D11b, D21a, D21b, D31a, D31b, D41a, D41b, and P1' from storage devices D1, D2, D3, D4, D5, D6, D7, D8, and D9, respectively.

Similarly, the storage processing circuitry 40 unmaps the uber 310(2) to deconstruct the uber 310(2). The storage processing circuitry 40 then maps disk slices 46 to create the new uber 310(4). By way of example, the storage processing circuitry 40 uses none of the storage from the same storage devices D1, D2, D3, D4, and D5 that was used to form the uber 310(2). Rather, the storage processing circuitry 40 uses some of the storage from the same storage devices D1, D2, D3, D4, and D5 that was used to form the uber 310(1), as well as new storage from the storage devices D6, D7, D8, and D9. FIG. 6 shows the new uber 310(4) created from disk slices 46 mapped as D12a, D12b, D22a, D22b, D32a, D32b, D42a, D42b, and P2' from storage devices D1, D2, D3, D4, D5, D6, D7, D8, and D9, respectively.

For simplification, the storage device D9 includes the disk slices 46 for parity. However, it should be understood that other storage devices 42 may include parity disk slices 46 as well (e.g., randomly distributed, in a staggered manner, etc.).

Now, that the new ubers 310(3), 310(4) have been created, the new ubers 310(3), 310(4) are available for use in the log-structured storage. Along these lines, a garbage collecting background service may eventually write consolidated valid data 44 into the ubers 310(3), 310(4) during standard garbage collection. Additionally, the storage processing circuitry 40 may write updated or new data 44 into the ubers 310(3), 310(4) during normal input/output (I/O) operations.

It should be understood that, in contrast to a conventional approach of independently performing a relocation task and a garbage collection task in which there are no additional benefits derived by each task, the above-described RAID transformation process that increases storage efficiency requires significantly less work. Nevertheless, data is successfully and effectively garbage collected and relocated between RAID configurations. Further details will now be provided in accordance with the second example situation.

Figure 7:
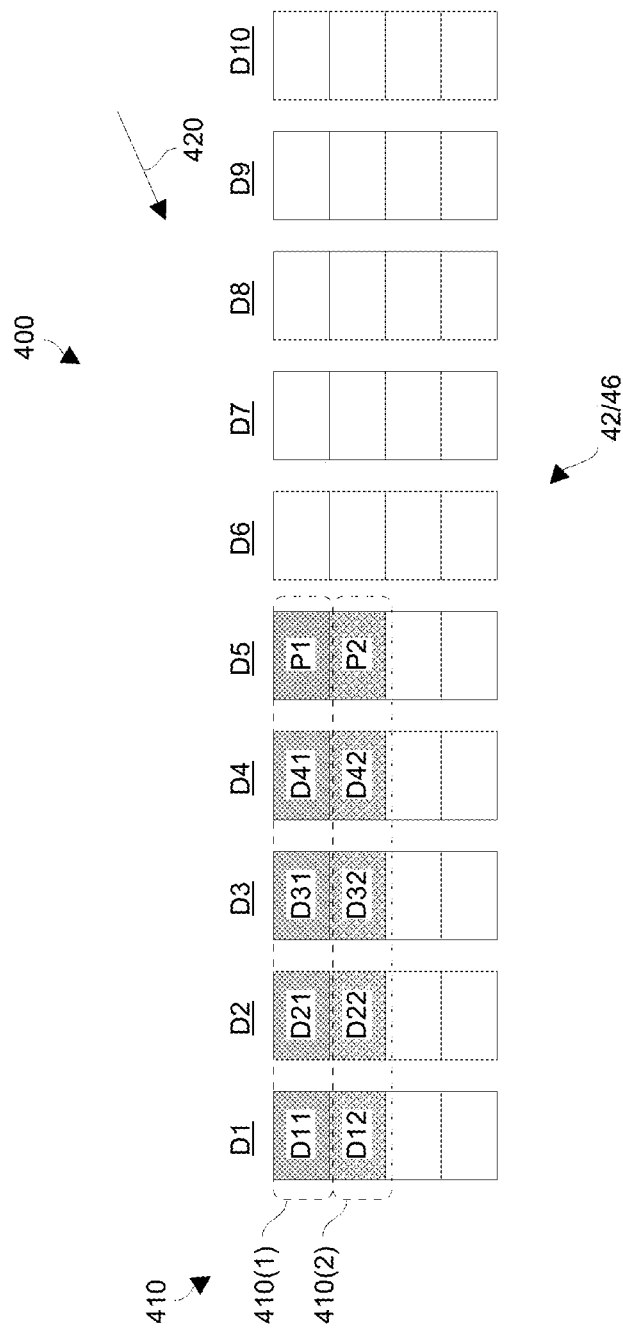
FIG. 7 is a block diagram illustrating particular details of a third RAID transformation example in accordance with certain embodiments.
Figure 8:
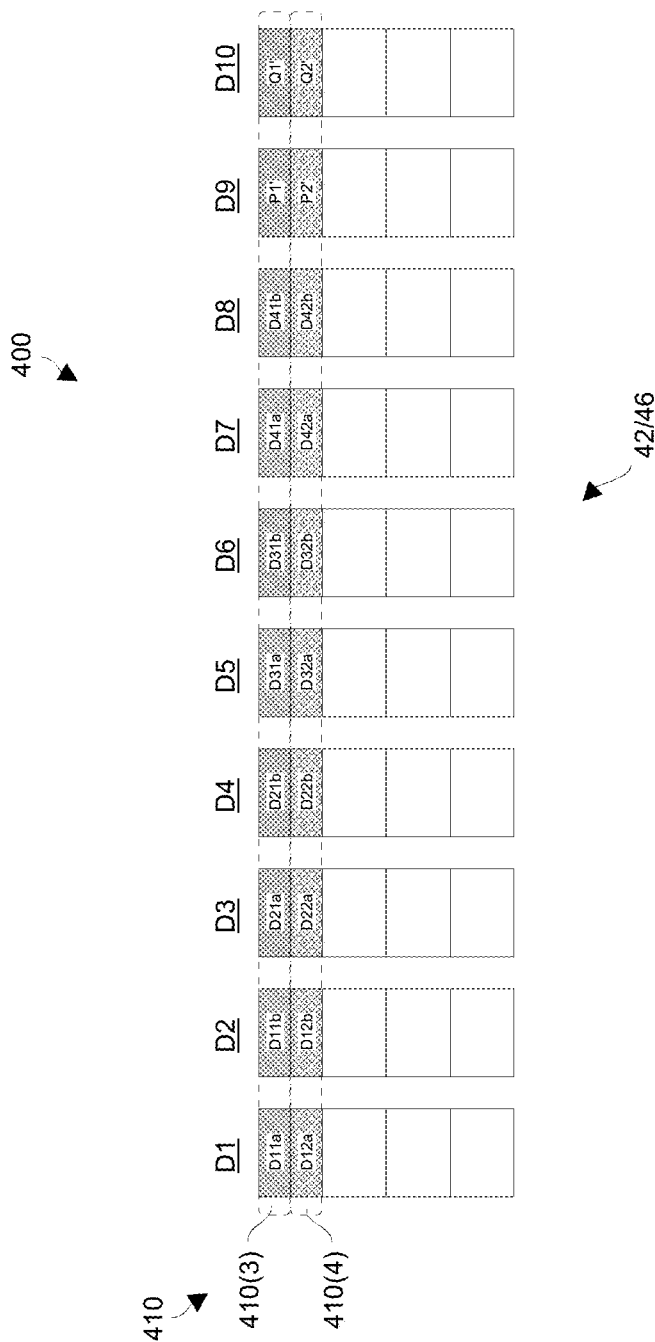
FIG. 8 is a block diagram illustrating additional details of the third RAID transformation example in accordance with certain embodiments.

FIGS. 7 and 8 show, in accordance with certain embodiments, various details for a third RAID transformation example 400 in which a new RAID configuration having a better RAID protection is used in place of an initial RAID configuration. FIG. 7 shows where data 44 originally resides prior to RAID transformation. FIG. 8 shows where the data 44 eventually resides following RAID transformation while leveraging garbage collection.

Initially, as shown in FIG. 7, suppose that storage devices 42 identified as D1, D2, D3, D4, and D5 are currently in use (also see FIG. 1). It should be understood that the example arrangement in FIG. 7 is similar to those shown in FIGS. 3 and 5, and that some of the description that applies to the first RAID transformation example 200 and the first RAID transformation example 300 similarly applies to the third RAID transformation example 400. For example, the storage processing circuitry 40 initially maps a set of disk slices 46 to form a first uber 410(1), and another set of disk slices 46 to form a second uber 410(2). The first uber 410(1) includes four disk slices 46 mapped as D11, D21, D31, and D41 to store data, and one disk slice 46 mapped as P1 to store parity in accordance with RAID5(4+1). Likewise, the second uber 410(2) includes four disk slices 46 mapped as D12, D22, D32, and D42 to store data, and one disk slice 46 mapped as P2 to store parity in accordance with RAID5(4+1).

Further suppose that additional capacity has just been added in the form of new storage devices 42 identified as D6, D7, D8, D9, and D10. Along these lines, the storage devices D6, D7, D8, D9, and D10 may have been added to increase storage capacity of the log-structured storage, to replace older storage devices 42 that are getting closer to their end of life or wear limit, and so on.

Now, suppose that the data storage equipment 24 receives a RAID transformation command 420 to begin utilizing the additional storage space provided by storage devices D6, D7, D8, D9, and D10. Such a command 420 may be initiated in a variety of ways as similarly explained above in connection with the RAID commands 220, 320 (also see FIGS. 3 and 5).

In response to the command 420, the storage processing circuitry 40 identifies (i) one or more existing ubers 410 to process, (ii) a RAID configuration for one or more new ubers 410, and (iii) the storage devices 42 that will provide additional disk slices 46 for the one or more new ubers 410. In the example, suppose that the storage processing circuitry 40 identifies existing ubers 410(1), 410(2) for RAID transformation. Further suppose that the command 420 indicates that the new ubers 310 are to use a RAID5(8+2) configuration for greater RAID protection.

During the transformation process, the storage processing circuitry 40 performs a specialized garbage collection operation that frees the existing ubers 410(1), 410(2) entirely. That is, such specialized garbage collecting consolidates the valid data 44 residing within the ubers 410(1), 410(2) to other storage within the log-structured storage. However, such garbage collecting relocates the valid data 44 from all of the disk slices 46 forming the ubers 410(1), 410(2) regardless of how many holes currently exist within the ubers 410(1), 410(2).

Upon completion of the specialized garbage collection operation, the storage processing circuitry 40 reallocates the storage from the existing ubers 310(1), 310(2) to new ubers 310(3), 310(4). That is, the storage processing circuitry 40 unmaps the disk slices 46 of the existing ubers 310(1), 310(2) to enable reuse of the storage of the disk slices 46. In this second example 400, all of the storage from the original uber 410(1) is reused, but none of the storage from the original uber 410(2) is reused.

In particular, the storage processing circuitry 40 unmaps the uber 410(1) to deconstruct the disk slices 46 that formed the uber 410(1). The storage processing circuitry 40 then maps disk slices 46 to create the new uber 410(3). By way of example, the storage processing circuitry 40 uses none of the storage from the same storage devices D1, D2, D3, D4, and D5 that was used to form the uber 310(2). Rather, the storage processing circuitry 40 uses some of the storage from the same storage devices D1, D2, D3, D4, and D5 that was used to form the uber 310(1), as well as new storage from the storage devices D6, D7, D8, D9, and D10. By way of example, the storage processing circuitry 40 uses the same storage from the storage devices D1, D2, D3, D4, and D5 that was used to form the uber 410(1) as well as new storage from the storage devices D6, D7, D8, D9, and D10. FIG. 8 shows the new uber 410(3) created from disk slices 46 mapped as D11a, D11b, D21a, D21b, D31a, D31b, D41a, D41b, P1', and Q1' from storage devices D1, D2, D3, D4, D5, D6, D7, D8, D9, and D10, respectively.

Similarly, the storage processing circuitry 40 unmaps the uber 310(2) to deconstruct the uber 310(2). The storage processing circuitry 40 then maps disk slices 46 to create the new uber 310(4). By way of example, the storage processing circuitry 40 uses none of the storage from the same storage devices D1, D2, D3, D4, and D5 that was used to form the uber 410(2). Rather, the storage processing circuitry 40 uses some of the storage from the same storage devices D1, D2, D3, D4, and D5 that was used to form the uber 410(1), as well as new storage from the storage devices D6, D7, D8, D9, and D10. FIG. 8 shows the new uber 310(4) created from disk slices 46 mapped as D12a, D12b, D22a, D22b, D32a, D32b, D42a, D42b, P2', and Q2' from storage devices D1, D2, D3, D4, D5, D6, D7, D8, D9, and D10, respectively.

It should be understood that P1' and Q1' refer to parity segments for a first RAID stripe in accordance with RAID5 (8+2). Likewise, P2' and Q2' refer to parity segments for a second RAID stripe in accordance with RAID5(8+2).

For simplification, the storage devices D9 and D10 include the disk slices 46 for parity. However, it should be understood that other storage devices 42 may include parity disk slices 46 as well (e.g., randomly distributed, in a staggered manner, etc.).

Now, that the new ubers 410(3), 410(4) have been created, the new ubers 410(3), 410(4) are available for use in the log-structured storage. Along these lines, a garbage collecting background service may eventually write consolidated valid data 44 into the ubers 410(3), 410(4) during standard garbage collection. Additionally, the storage processing circuitry 40 may write updated or new data 44 into the ubers 410(3), 410(4) during normal input/output (I/O) operations.

It should be understood that, in contrast to a conventional approach of independently performing a relocation task and a garbage collection task in which there are no additional benefits derived by each task, the above-described RAID transformation process that increase RAID protection requires significantly less work. Nevertheless, data is successfully and effectively garbage collected and relocated between RAID configurations. Further details will now be provided with reference to FIG. 9.

Figure 9:
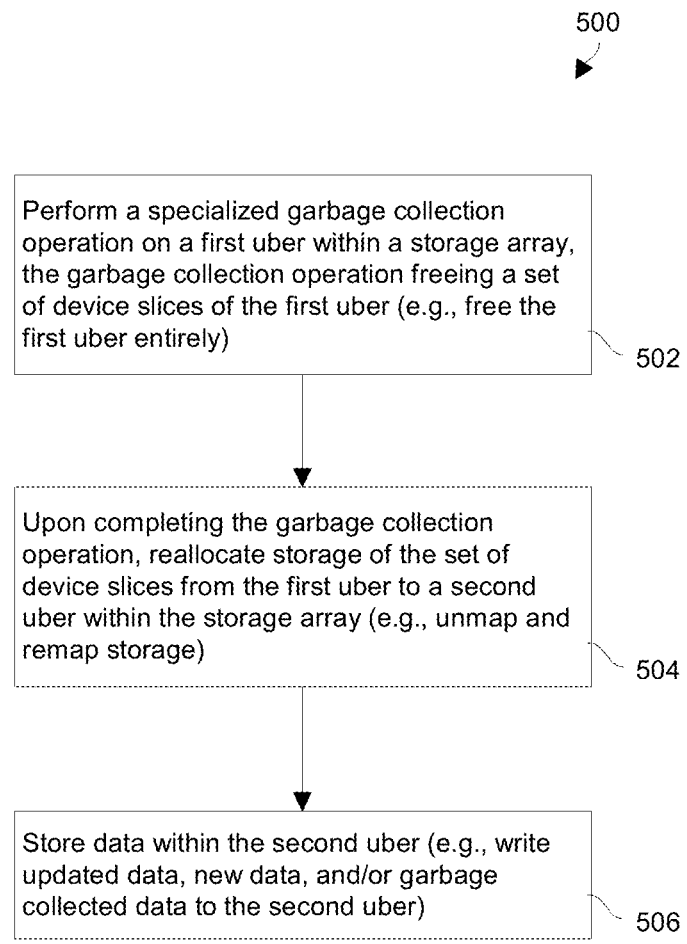
FIG. 9 is a flowchart of a procedure which is performed by a data storage environment in accordance with certain embodiments.

FIG. 9 is a flowchart of a procedure 500 which is performed by data storage equipment within a data storage environment to perform a RAID transformation process that leverages garbage collection. Such a RAID transformation process accomplishes both RAID transformation and garbage collection but while saving overhead and without negatively impacting system performance.

At 502, data storage equipment performs a specialized garbage collection operation on a first uber within a storage array, the garbage collection operation freeing a set of device slices of the first uber. In contrast to conventional garbage collection that garbage collects sparsely used storage, the specialized garbage collection operation of 402 frees the first uber entirely.

At 504, upon completing the garbage collection operation, the data storage equipment reallocates storage of the set of device slices from the first uber to a second uber within the storage array. Here, the data storage equipment unmaps and remaps storage (e.g., to the same RAID layout, to increase storage efficiency, to strengthen RAID protection, combinations thereof, and so on).

At 506, after the storage of the set of device slices is reallocated from the first uber to the second uber, the data storage equipment stores data within the second uber. In particular, as the data storage equipment writes to new storage within log-structured storage, the data storage equipment may write updated data, new data, and/or garbage collected data to the second uber.

As described above, improved techniques are directed to performing RAID transformation while leveraging garbage collection. Along these lines, in log-structured storage, garbage collection is performed to free an initial uber, and disk slices 46 of the initial uber are then unmapped and remapped to form a new uber. Data 44 is then written to the new uber during normal log-structured storage operations (e.g., via updating data or writing new data, via standard garbage collection, etc.). Such leveraging of garbage collection when performing RAID transformation reduces overhead (e.g., less reads and writes) and wear (e.g., fewer program/erase cycles) without negatively affecting system performance.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the data storage environment 20 such as one or more host computers 22 and/or one or more other devices 28 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

Additionally, it should be understood that an "uber" may also be referred to by other different terms such as a RAID extent or a RAID stripe. Similarly, a "disk slice" may also be referred to by other different terms such as a disk extent. Likewise, a "PLB" (i.e., a physical large block that may be considered the smallest allocation unit) may also be referred to by other different terms such as a RAID slice. Other terminology that is used within this document may be referred to using other different terms as well.

Furthermore, it should be understood that the above-provided example situations involved introducing new storage capacity by way of example only. In some arrangements, there is no new storage capacity introduced. Rather, the data storage equipment reuses the existing storage in a more optimized manner, e.g., utilizing the most desirable drives, using a preferred RAID configuration, combinations thereof, etc. Such reuses is performed with less overhead compared to conventional RAID transformation and garbage collection performed independently and with no negative performance impact.

It should be appreciated that storage system designs often deal with the trade-off among performance, utilization, efficiency, and protection.

Performance: Minimize background operations and achieve better host 10 performance.
Utilization: Utilize capacity from old and new drives.
Efficiency: Reduce the overhead based on system configurations.
Protection: Provide the desirable protection based on system configurations.

When new drives are added, in order to utilize the additional capacity and improve efficiency and protection dynamically, a storage system needs to relocate data at the expense of additional background operations.

Traditionally, storage systems deploy various logics to make use of the additional capacity and to transform RAID type and width.

Case 1: Relocate from old drives to new ones while keeping RAID configuration (e.g., R5 4+1 to 4+1).
Case 2: Transform to wider RAID width and better storage efficiency (e.g., R5 4+1 to R5 8+1).
Case 3: Transform to better RAID protection with the same storage efficiency (e.g., R5 4+1 to R6 8+2).

Conventionally, these kinds of relocations and transformations achieve the desire outcomes, at the expense of additional background operations without any side benefits. In some cases, the background operations and data movements can be very extensive and expensive.

Consider three RAID transformation cases.
Case 1: Data needs to be relocated causing the read and write of a few disk extents.
Case 2: Data format needs to be reconfigured completely causing the read and write of an entire RAID extent.
Case 3: Data format needs to be reconfigured completely, causing the read and write of an entire RAID extent.

During transformation, new data needs to be written to both old and new locations, creating additional IO overheads.

In accordance with certain embodiments, RAID transformation takes advantage of the characteristics of a log-structured storage system. In the log-structured system, data is always written to new locations (free segments) and old locations are marked as holes to be garbage-collected. In the background, garbage collection combines these holes to generate free segments (e.g., PLBs). This garbage-collection process can be leveraged to also free an entire uber (e.g., a mapped-raid unit) by freeing up all of the segments (PLBs) in that uber. Once an uber is free, RAID can unmap and remap that uber in any new RAID configuration or even in the same RAID layout.

Instead of moving data for the sake of relocation and transformation only, a specialized garbage collection process frees an entire uber, and reallocates the storage of that uber using the desirable drives and the more desirable configuration with less overhead and more protection. With this improved technique, new capacity is utilized, and storage efficiency and protection may be improved. All may be accomplished without adding additional background operations and without negatively affecting system performance.

Consider a first comparison to conventional restriping. In particular, in a conventional system, consider an 8+1 R5 uber which is 50% utilized where restriping of three drives is needed. Each position in the 8+1 uber has 8 GB of data on it. Accordingly, for three drive restriping, 24 GB of data is read and written.

In addition to conventional restriping, independent garbage collection involves reading 64 GB and writing 36 GB (32 GB data+4 GB parity). Accordingly, the conventional system moves more data with garbage collection compared to conventional restriping.

However, in accordance with certain embodiments, RAID transformation leveraging garbage collection creates 64 GB worth of free PLBs. Whereas in conventional restriping, there are no new free PLBs.

So RAID transformation leveraging garbage collection unmapping of an uber is a by-product of regular garbage-collection and hence free of cost. The only cost is that garbage collection is cleaning all the PLBs in the uber even though some of them could be sub-optimal for cleaning operations. Nevertheless, the overhead of this sub-optimal PLB selection may be much less than the multi-drive restripe overhead in most typical cases.

TABLE 1

First Comparison

| | Uber | Initial State | Restripe Read GB | Restripe Write GB | Intermediate State | GC Read GB | GC Write GB | Final State |
|---|---|---|---|---|---|---|---|---|
| Independent Transformation and GC | 1 | 50% | 24 | 24 | 50% | 64 | — | 0% |
| | 2 | 50% | 24 | 24 | 50% | 64 | — | 0% |
| | 3 | 0% | — | — | 0% | — | 64 + 8 | 100% |
| RAID Transformation Leveraging Garbage Collection | 1 | 50% | — | — | — | 64 | — | 0% |
| | 2 | 50% | — | — | — | 64 | — | 0% |
| | 3 | 0% | — | — | — | — | 64 + 8 | 100% |

Consider a second comparison to conventional transforming. In particular, in a conventional system, consider an 8+1 R5 Uber which is 50% utilized and where transformation to 16+2 R6 is needed. Each position in the 8+1 uber has 8 GB of data on it. So, for transforming, 64 GB of data has to be read and 72 GB of data has to be written (64 GB data+4 GB P parity+4 GB Q parity). This is because transformation changes the RAID layout, and all data have to be read and rewritten (e.g., also see FIGS. 3 through 8).

In addition to conventional transforming, independent garbage collection involves reading 64 GB and writing 36 GB (32 GB data+4 GB parity). So from this perspective, more data is being moved with garbage collection compared to transforming.

However, in accordance with certain embodiments, RAID transformation leveraging garbage collection creates 64 GB worth of free PLBs. Whereas in conventional restriping, there are no new free PLBs. creating 64 GB worth of free PLBs.

So again RAID transformation leveraging garbage collection unmapping of an uber is a by-product of regular garbage-collection and hence free of cost. The only cost is that garbage collection is cleaning all the PLBs in the uber even though some of them could be sub-optimal for cleaning operations. Nevertheless, the overhead of this sub-optimal PLB selection may be much less than the multi-drive restripe overhead in most typical cases.

TABLE 2

Transformation and GC data movement comparison

| | Uber | Initial State | Xform Read GB | Xfrom Write GB | Intermediate State | GC Read GB | GC Write GB | Final State |
|---|---|---|---|---|---|---|---|---|
| Independent | 1 | 50% | 64 | 64 + 4 + 4 | 50% | 64 | — | 0% |
| Transformation and | 2 | 50% | 64 | 64 + 4 + 4 | 50% | 64 | — | 0% |
| GC | 3 | 0% | — | — | 0% | — | 64 + 4 + 4 | 100% |
| RAID | 1 | 50% | — | — | — | 64 | — | 0% |
| Transformation | 2 | 50% | — | — | — | 64 | — | 0% |
| Leveraging Garbage Collection | 3 | 0% | — | — | — | — | 64 + 4 + 4 | 100% |

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document. Such modifications and enhancements are intended to belong to various embodiments of the disclosure.

What is claimed is:

1. A method of performing Redundant Array of Independent Disks (RAID) transformation, the method comprising:
   receiving a RAID transformation command sent by an administrator;
   performing a garbage collection operation on a first uber within a storage array in response to the RAID transformation command, the garbage collection operation freeing a set of device slices of the first uber;
   upon completing the garbage collection operation, reallocating storage of the set of device slices from the first uber to a second uber within the storage array; and
   after the storage of the set of device slices is reallocated from the first uber to the second uber, storing data within the second uber;
   wherein the RAID transformation command (i) identifies multiple ubers including the first uber, and (ii) directs the storage array to perform the garbage collection operation as part of a RAID transformation processing on all of the identified multiple ubers; and
   wherein performing the garbage collection operation on the first uber includes garbage collecting data from the first uber independently of how many sections of invalid data currently exist in the first uber.

2. A method as in claim 1 wherein performing the garbage collection operation includes:
   garbage collecting the first uber entirely to free all disk slices of the first uber.

3. A method as in claim 2 wherein reallocating the storage of the set of disk slices from the first uber to the second uber includes:
   unmapping the first uber to deconstruct the first uber.

4. A method as in claim 3 wherein reallocating the storage of the set of disk slices from the first uber to the second uber further includes:
   after the first uber is unmapped, creating the second uber from the storage of the set of disk slices from the first uber.

5. A method as in claim 4 wherein creating the second uber includes:
   mapping a new set of disk slices to construct the second uber, the new set of disk slices reusing at least some of the storage of the set of disk slices from the first uber.

6. A method as in claim 5 wherein the first uber and the second uber implement a same RAID configuration.

7. A method as in claim 5 wherein the first uber implements a first RAID width; and
   wherein the second uber implements a second RAID width that is different from the first RAID width.

8. A method as in claim 5 wherein the first uber and the second uber have a same number of disk slices storing parity.

9. A method as in claim 5 wherein the first uber has a first number of disk slices storing parity; and
   wherein the second uber has a second number of disk slices storing parity, the second number of disk slices storing parity being different from the first number of disk slices storing parity.

10. A method as in claim 5 wherein the second uber includes all of the disk slices of the first uber.

11. A method as in claim 2 wherein garbage collecting the first uber entirely to free all disk slices of the first uber includes:

consolidating all valid data from the first uber into a third uber which is different from the first uber and the second uber.

12. A method as in claim 11 wherein storing the data within the second uber includes:
    storing at least some valid data from the third uber into the second uber.

13. A method as in claim 12 wherein storing the at least some valid data from the third uber into the second uber includes:
    updating the valid data to form newest data and writing the newest data into the second uber.

14. A method as in claim 12 wherein storing the at least some valid data from the third uber into the second uber includes:
    consolidating at least a portion of the at least some valid data from the third uber into the second uber.

15. A method as in claim 1, further comprising:
    constructing the first uber and storing data in the first uber; and
    after the first uber is constructed and after data is stored in the first uber, detecting a set of new storage devices being added to the storage array, the set of new storage devices providing new disk slices that are separate from storage of the first uber.

16. A method as in claim 15 wherein reallocating the storage of the set of disk slices from the first uber includes:
    constructing the second uber from at least some of the storage of the set of disk slices from the first uber and storage of the set of new storage devices.

17. A method as in claim 16, further comprising:
    after constructing the first uber and prior to performing the garbage collection operation, incorporating the first uber in log-structured storage.

18. A method as in claim 17, further comprising:
    after constructing the second uber and prior to storing the data within the second uber, incorporating the second uber in the log-structured storage.

19. A method as in claim 1, further comprising:
    performing garbage collection operations on all of the remaining ubers of the identified multiple ubers to garbage collect other data from the remaining ubers to a set of new ubers independently of how many sections of invalid data currently exist in the remaining ubers.

20. Data storage equipment, comprising:
    memory; and
    control circuitry coupled to the memory, the memory storing instructions which, when carried out by the control circuitry, causes the control circuitry to perform a method including:
        receiving a RAID transformation command sent by an administrator;
        performing a garbage collection operation on a first uber within a storage array in response to the RAID transformation command, the garbage collection operation freeing a set of disk slices of the first uber;
        upon completing the garbage collection operation, reallocating storage of the set of disk slices from the first uber to a second uber within the storage array, and
        after the storage of the set of disk slices is reallocated from the first uber to the second uber, storing data within the second uber;
    wherein the RAID transformation command (i) identifies multiple ubers including the first uber, and (ii) directs the storage array to perform the garbage collection operation as part of a RAID transformation processing on all of the identified multiple ubers; and
    wherein performing the garbage collection operation on the first uber includes garbage collecting data from the first uber independently of how many sections of invalid data currently exist in the first uber.

21. A computer program product having a non-transitory computer readable medium which stores a set of instructions to perform Redundant Array of Independent Disks (RAID) transformation; the set of instructions, when carried out by computerized circuitry, causing the computerized circuitry to perform a method including:
    receiving a RAID transformation command sent by an administrator;
    performing a garbage collection operation on a first uber within a storage array in response to the RAID transformation command, the garbage collection operation freeing a set of disk slices of the first uber;
    upon completing the garbage collection operation, reallocating storage of the set of disk slices from the first uber to a second uber within the storage array; and
    after the storage of the set of disk slices is reallocated from the first uber to the second uber, storing data within the second uber;
    wherein the RAID transformation command (i) identifies multiple ubers including the first uber, and (ii) directs the storage array to perform the garbage collection operation as part of a RAID transformation processing on all of the identified multiple ubers; and
    wherein performing the garbage collection operation on the first uber includes garbage collecting data from the first uber independently of how many sections of invalid data currently exist in the first uber.

* * * * *